United States Patent

[11] 3,537,469

[72] Inventor Charles E. Hagar
　Maryland Heights, Missouri
[21] Appl. No. 747,315
[22] Filed July 24, 1968
[45] Patented Nov. 3, 1970
[73] Assignee American Air Filter Company, Inc.
　Louisville, Kentucky
　a corporation of Delaware

[54] INFLATION PRESSURE CONTROLLER
5 Claims, 3 Drawing Figs.
[52] U.S. Cl. .................................................. 137/116.3,
　137/116.5, 137/118, 137/224
[51] Int. Cl. .................................................. G05d 16/00
[50] Field of Search ........................................ 137/116,
　116.3, 119, 116.5, 118, 224, 226

[56] References Cited
UNITED STATES PATENTS
1,286,119 11/1918 Sagasar ........................ 137/224
1,311,898 8/1919 Jackson ........................ 137/226
2,392,214 1/1946 Cruzan ........................ 137/116

Primary Examiner—William F. O'Dea
Assistant Examiner—William H. Wright
Attorney—Ralph B. Brick ABSTRACT: A pressure sensitive regulator to control flow of gas from a high pressure source to a low pressure receiving means which includes a sleeve adapted to receive a piston which is connected to operate a first valve assembly disposed within the sleeve to shut off flow of high pressure gas through the device. The piston moves in response to change in pressure in the gas receiving means so the valve is seated when a selected pressure is reached in the receiving device. The regulator also includes a second valve assembly operated in response to selected movement of the first valve to exhaust the high pressure gas supplied to the device when the first valve is seated.

Patented Nov. 3, 1970
3,537,469
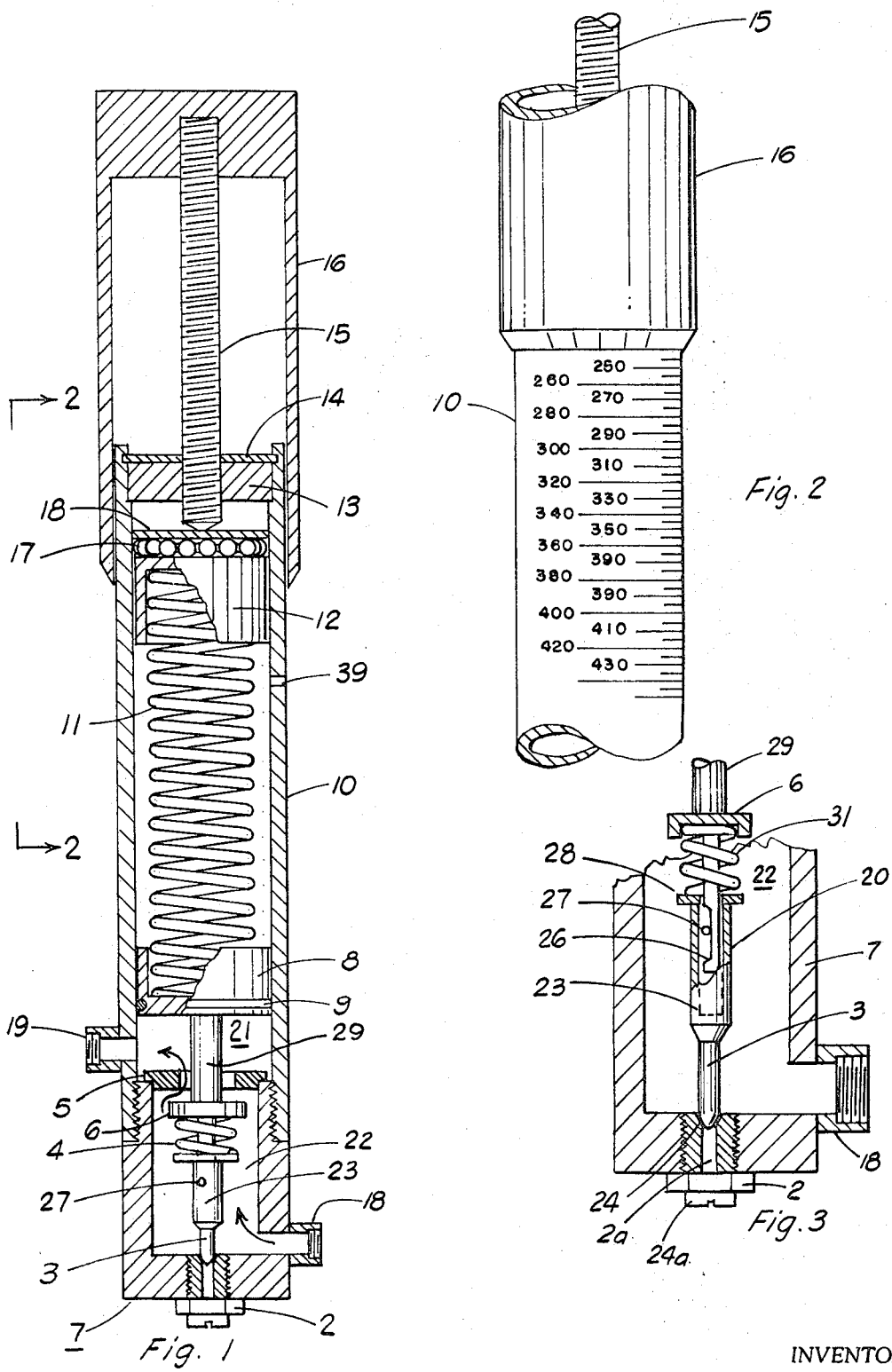
INVENTOR.
Charles E. Hagar
BY Edward M. Stauterman 3,537,469

INFLATION PRESSURE CONTROLLER

BACKGROUND OF THE INVENTION

In various applications where gas is supplied from a high pressure source to inflate or increase the pressure in a selected receiving means, for example a pneumatic tire, it is desirable to provide a reliable means for terminating flow of the high pressure gas when a selected pressure has been attained in the receiving means and various types of apparatus have been provided to accomplish this objective. In some such previous inflation regulators a flow control valve is held open manually until a signal is actuated to indicate that the selected pressure has been attained and the flow of gas is then manually terminated. In other arrangements, gas flow is automatically terminated, but the device is manually reset for subsequent operation.

In some other devices the high pressure gas is exhausted from the regulator when the selected pressure has been attained in the device to be inflated, but in such previous devices the valve casing has been displaced to exhaust the high pressure gas so the full flow of compressed gas is exhausted to the atmosphere and lost. Furthermore, such devices have been extremely expensive, complex, and difficult to maintain because the sealing surfaces have been large so the probability of undesirable gas leakage is great.

SUMMARY OF THE INVENTION

The present invention provides a regulator for inflation of a selected device from a high pressure fluid source, and it is recognized that the device provided by the present invention is straightforward, easy to fabricate and assemble, and is highly effective.

Furthermore, it is recognized that the present invention provides a gas inflation regulator which provides positive seating means to terminate gas flow through the device so a minimal amount of the high pressure fluid is exhausted when the preselected pressure is attained in the receiving device.

Various other features of the present invention will become obvious to those skilled in the art upon reading the disclosure set forth hereinafter.

More particularly, the present invention provides a regulator to control flow of gas from a high pressure source to a low pressure receiving device comprising: a regulator casing including a sleeve having a high pressure gas inlet, a low pressure gas outlet, and an exhaust outlet; a first valve seat disposed in the casing with the high pressure gas inlet and exhaust gas outlet on one side and the low pressure gas outlet on the other side of the valve seat so gas flows from the gas inlet through the valve seat and out of the regulator through the gas outlet; first valve means to be selectively seated in the first valve seat; piston means disposed within the sleeve so the gas outlet is between the valve seat and the piston means; means to connect the piston means to the valve means so the valve means is moved toward and away from the seat in response to movement of the piston in the sleeve; second valve means to be seated in the gas exhaust; means for linking the first valve means to the second valve means to unseat the second valve means to permit escape of high pressure gas from the device when the first valve means has traveled a selected distance toward the first valve seat; first spring means to urge the piston in a direction to unseat the first valve means; and means to selectively adjust the force exerted by the first spring on the piston means.

It is to be understood that the description of one example of the present invention given hereinafter is not by way of limitation and that various modifications of the example within the scope of the present invention will occur to those skilled in the art upon reading the disclosure set forth hereinafter.

Referring to the FIGS. which show an example of one apparatus in accordance with the present invention:

FIG. 1 is a view in section of an example of one gas pressure regulator within the scope of the present invention;

FIG. 2 is a view taken along a plane passing through line 2-2 of FIG. 1; and

FIG. 3 is an enlarged view of the gas inlet portion of the regulator of FIG. 1.

The apparatus shown in the FIGS. can be used to regulate the flow of fluid from a high pressure source, for example an air compressor (not shown), to a low pressure receiving means, for example a tire to be inflated (also not shown).

As shown, a sleeve 10 is provided with a gas outlet connection 19 adapted to be connected to the device to be inflated where sleeve 10 is adapted to receive a valve assembly 7 threaded into a cooperative open end of the sleeve.

Valve assembly 7 includes a high pressure gas inlet 18, adapted to be connected to a source of high pressure gas and a high pressure gas exhaust outlet adapted to receive an outlet seat assembly 2 which provides a restricted passageway 2a and a valve seat 24. As shown, assembly 2 can be threaded into valve assembly 7 so the position of seat assembly 2 relative to needle valve 3, hereinafter described, can be selectively adjusted to advantageously affect operation of the inflator device. Valve assembly 7 provides a valve chamber 22 in communication with the inside of sleeve 10 and inlet 18.

A valve seat 5 is disposed at the outlet of chamber 22 of valve assembly 7, and a valve member 6, hereinafter described, is disposed to move longitudinally in chamber 22 to be received in seating relation by valve seat 5.

Referring to FIG. 3, a connector stem 26 is fastened to valve seat 5, for example, by cooperative threaded means (not shown) and stem 26 is received within a sleeve 20 of a needle valve assembly 23 disposed in valve assembly 7. As shown in FIG. 3, connector stem 26 is free to move longitudinally within sleeve 20 and includes a groove 26a to receive a cooperative pin 27 provided to extend through sleeve 20 to restrict movement of connector 26 within sleeve 20. The arrangement allows free movement of stem 26 within limits and when groove 26a contacts pin 27, sleeve 20 moves with connector stem 26. A peripheral lip 28 is provided around the end of sleeve 20, as shown, to provide a base for a spring 31, as hereinafter described, and a needle valve 3 is connected to the other end of sleeve 20 and the needle valve is disposed to be received in sealing relation by seat 24 of assembly 2. Valve member 6 is adapted to be received in sealing relation by seat 5 and includes a spring-receiving recess 6a so spring 31, which is coiled around stem 26, is disposed between the lip 28 of sleeve 23 and a recess in valve member 6, as shown, to be compressed and relaxed with movement of rod 26 relative to sleeve 23 and to urge needle valve 3 to sealing relation in seat 24 of exhaust outlet assembly 2.

A piston 8 is adapted to be received by sleeve 10 and slide longitudinally within sleeve 10 to define an outlet chamber 21 with seat 5 so gas outlet 19 communicates with chamber 21. Piston 8 is connected to valve 6 by means of a rod 29 and moves in sleeve 10 in response to change in pressure in chamber 21 and can include a sealing member, for example, an O-ring 9, to prevent flow of gas past the piston. Piston 8 can be hollow, as shown, to receive one end of a spring 11 which is provided to urge piston 8 toward seat 5 to hold the valve assembly open.

Internal threads are provided at the end of sleeve 10 opposite valve assembly 7 and a cooperative threaded insert 13 can be provided as shown. A spring cap 12 is slidably disposed in sleeve 10 to receive the free end of spring 11 so the spring is compressed between piston 8 and cap 12 to exert a force on piston 9 to urge the piston toward seat 5 to open the valve assembly.

Screw insert 13 includes a central threaded aperture as shown, which is adapted to receive a lead screw 15 connected to a thimble 16. A back-up washer 18 is provided to be contacted by the end of lead screw 15 to prevent wear and damage to cap 12 and a bearing ring 17 is provided between back-up washer 18 and cap 12 so that back-up washer 18 and cap 12 can be rotated independently without drag. Lead screw 15 is connected to thimble 16 which is rotated in one direction to advance the lead screw into sleeve 10 to urge washer 18 and cap 12 against spring 11 to increase the force exerted on piston 8 and is rotated in an opposite direction to withdraw lead screw 15 from sleeve 10 to reduce the force exerted on piston 8.

As shown in FIG. 2, a vernier scale can be provided on the outside of sleeve 10 to indicate the pressure required in chamber 21 to cause valve 6 to be seated in valve seat 5 to terminate flow through the valve, as hereinafter described. As hereinbefore described needle valve seat assembly 2 can be threaded into valve assembly 7. The assembly is advantageously positioned in valve assembly 7 so needle valve 3 is removed from seat 24 just as valve 6 is in position to close valve seat 5.

It will be noted that in the example shown, the regulator can be easily disassembled by removing valve assembly 7 so that piston 8, spring 11, and cap 12 are then removed from the end of sleeve 10.

Before inflation of the selected device, thimble 16 is rotated to set the pressure to be applied to the device to be inflated as indicated on the scale on the side of sleeve 10. A source of high pressure gas, for example, nitrogen or compressed air, is connected to high pressure inlet 18 and outlet 19 is connected to the tire or other device to be inflated. Flow of gas is initiated and high pressure gas flows, as shown by the arrows, into chamber 22 through valve seat 5 to chamber 21 and out of outlet 19 into the device to be inflated. As the pressure in the device to be inflated increases, the flow of gas through chamber 21 decreases and the force exerted on the surface of piston 8 is likewise increased to overcome the force exerted by spring 11 so piston 8 is urged away from valve seat 5 to urge valve 6 to sealing relation with seat 5. The pressure in chamber 21 increases, and eventually the force exerted by the gas pressure balances the force exerted by spring 11, so piston 8 moves to further compress spring 11 so the force balance is maintained. As hereinbefore described, piston 8 is linked to valve 6 by rod 26 and movement of the piston causes movement of valve member 6 toward a seating position in valve seat 5 to terminate flow of gas through outlet 19.

At a selected pressure, piston 8 has moved far enough to cause valve 6 to be seated in valve seat 5, and advantageously, connector 26 which is connected to valve 6 is disposed to have been moved in sleeve 20 throughout the length of travel of groove 26a when valve 6 closes on valve seat 5 so the edge of groove 26a contacts pin 27 to move sleeve 20 longitudinally within chamber 22 and withdraw needle valve 3 from seat 24 so high pressure gas is exhausted through outlet 2. The gas exhausted through outlet 2 makes a clearly distinguishable sound, and in some applications, not shown, a whistle can be attached to exhaust 2 to indicate to the operator that the device has reached a selected pressure.

When the inflated device is disconnected from outlet 19, the pressure in chamber 21 is released so the force exerted by spring 11 urges valve 6 away from valve seat 5, and needle valve 3 is reseated in valve seat 24 of needle valve assembly 2.

I claim:

1. A regulator to control flow of gas from a high pressure source to a low pressure receiving device comprising: a regulator casing including a sleeve having a high pressure gas inlet, a low pressure gas outlet, and an exhaust outlet; a first valve seat disposed in said casing so said high pressure gas inlet and exhaust gas outlet are on one side of said seat and said low pressure gas outlet is on the other side of said first valve seat so gas flows from said gas inlet through said valve seat and out of said regulator through said low pressure gas outlet; first valve means to be selectively seated in said first valve seat; piston means disposed for movement within said sleeve so said low pressure gas outlet is between said first valve seat and said piston means; means to connect said piston means to said first valve means so said first valve means is moved toward and away from said first valve seat in response to movement of said piston in said sleeve; second valve means to be seated in said gas exhaust; means for connecting said first valve means to said second valve means to unseat said second valve means to permit escape of high pressure gas from said regulator when said first valve means has traveled a selected distance toward said first valve seat; first spring means to urge said piston in a direction to unseat said first valve means; and means to selectively adjust the force exerted by said first spring on said piston means.

2. The regulator of claim 1 wherein said sleeve includes a separable valve assembly to be removably retained in said sleeve, said valve assembly defining a chamber to receive said first valve so said gas inlet and said gas outlet communicate with said chamber where said first valve seat is at the outlet from said chamber, where said exhaust outlet is in aligned relation with said outlet from said chamber, and said second valve is connected to said first valve means.

3. The regulator of claim 2 wherein said second valve means is connected to said first valve means by connector means which urge said second valve means to seated relation in said gas exhaust outlet during a portion of the travel of said first valve toward said first seat and which lift said second valve from said second seat after said first valve has moved a selected distance toward said first seat.

4. The regulator of claim 3 wherein said connector means includes stem means having groove means along a portion of the length thereof; second sleeve means connected to said second valve means wherein said sleeve means receives said stem means and is disposed to direct said valve means to said exhaust gas outlet; and pin means extending through said second sleeve means and said groove means of said stem means to restrict relative movement of said stem means and said second sleeve means.

5. The regulator of claim 2 wherein said piston is connected to said first valve means by rod means which extend through said seat means.